Patented Feb. 24, 1953

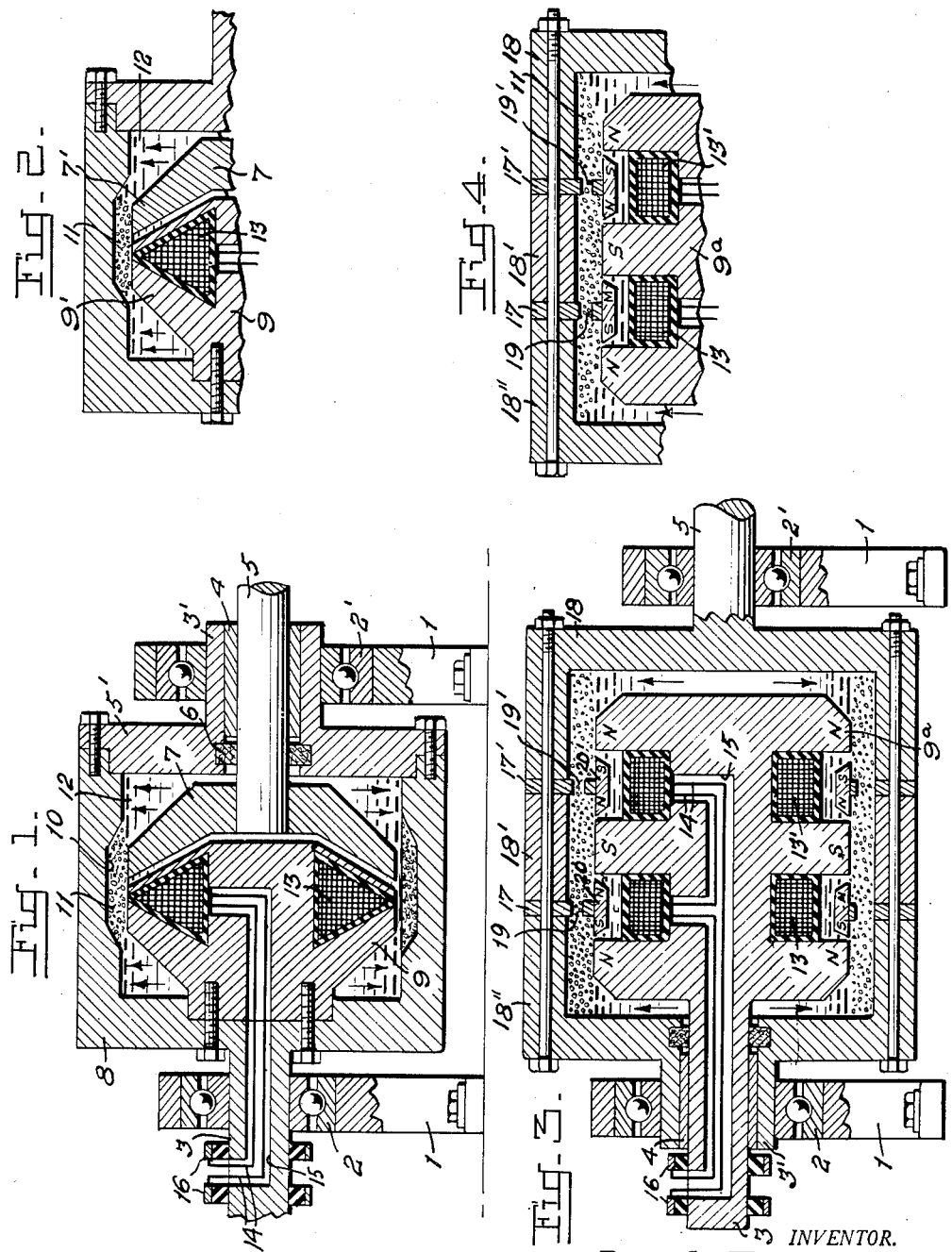

2,629,471

UNITED STATES PATENT OFFICE 2,629,471

RADIAL FLUX MAGNETIC FLUID CLUTCH

Jacob Rabinow, Takoma Park, Md., assignor to the United States of America as represented by the Secretary of the Army Application November 10, 1949, Serial No. 126,661

9 Claims. (Cl. 192—21.5)

(Granted under Title 35, U. S. Code (1952), sec. 266)

The invention described in the specification and claims may be manufactured and used by or for the Government for governmental purposes without the payment to me of any royalty thereon.

My invention relates to magnetic fluid clutches of the type employing a mixture of paramagnetic particles such as iron and a fluid vehicle such as oil, which, when subjected to a magnetic field acts to transmit force between two otherwise independently movable members. The particles will be referred to hereinafter as iron and the fluid as oil, since these are the most commonly used materials for the purpose, but it will be understood that any suitable paramagnetic material and any suitable fluid may be used, or the paramagnetic material may be used without the fluid.

In the art of magnetic fluid and magnetic fluid clutches, as described in copending applications, Serial No. 51,402, filed September 27, 1948 and Serial No. 783,426, filed October 31, 1947, now Patent No. 2,575,360, respectively, mention is made of desirable properties of such liquid and clutches. It is known that the fluid in these clutches acts chiefly as a lubricant and the magnetic action of the clutch is independent of the fluid used. Dry paramagnetic particles alone have been successfully, as indicated in applicant's co-pending application No. 783,426, now Patent No. 2,575,360.

My present invention is an improvement in clutches of the class described, said improvement residing in more complete release of the clutch when in a de-energized condition.

In clutches previously known to the art, two types of magnetic gaps have been used: the disk type and the cylinder type. In clutches using the disk configuration (axial gaps), centrifugal forces at high rotational speeds wedge the particles between the plates so that the clutches do not release when the magnetizing force is removed. In clutches of the cylindrical type (radial gaps), the centrifuging action is generally not as serious due to the smaller head of iron powder, but the field, being radial, does not oppose the centrifugal force, which also tends to pack or wedge the particles.

In the present invention, I use a magnetic gap, wherein the flux bridges cylindrical edges of opposing magnetic members. In this, a field is set up which has a radial magnetic gradient so that a particle of iron in this field is attracted toward the center. Clutches of this type have been built, and operated properly at speeds over 10,000 R. P. M.

The specific nature of the invention as well as other objects and advantages will clearly appear from a description of a preferred embodiment as shown in the accompanying drawings, in which:

Figure 1 shows a single-gap clutch in unenergized condition.

Figure 2 shows the gap of this clutch when energized.

Figure 3 shows a series-gap clutch in unenergized condition.

Figure 4 shows the gaps of this clutch when energized.

Referring first to Figure 1, suitable supports 1 carry bearings 2, 2' in which shafts 3, 3' are free to rotate, shaft 3' being tubular and containing a journal 4 in which shaft 5 may rotate, shaft 5 being formed on or attached to end plate 5'. A packing 6 serves as an oil seal between shaft 5 and end plate 5'.

End plate 5' cooperates with cup 8, on which shaft 3 is formed or affixed, to form a closed chamber containing the two major clutching elements. Of these two elements, one is a simple dished disk 7 affixed to shaft 5, while the other, a more complex structure, as hereinafter described, is affixed to shaft 3. The inner surface of the cup 8 is suitably grooved at 10. The cup 8, after being assembled around the clutch components, is filled with a small amount of iron powder 11 mixed in oil 12. The oil may be omitted if desired and dry iron powder alone may be used. Only members 7 and 9 are made of magnetic material, the cup 8, end plate 5 and the shafts being made of nonmagnetic material.

The structure of clutch member 9 is as shown, being mortised to receive an electrically insulated winding 13 to which electric current may be fed by leads 14 which run through a suitable passageway 15 in shaft 3 and are connected to slip rings 16.

When the clutch is filled with an iron-oil mixture, as described, only enough iron powder is included to fill the groove 10 on the inner side of cup 8 and not enough to touch the pole pieces. It will be apparent to one skilled in the art that when cup 8 is rotated rapidly by means of shaft 3, the iron will compact because of centrifugal force, and will be concentrated in groove 10; therefore, member 7 will be in no way coupled with cup 8 or member 9, since it is in a longitudinally fixed position in relation thereto, and will be free to rotate independently or to remain at rest, the only force acting upon it being caused by the negligible friction of bearing 4 and of the viscous drag of the light oil 12.

The action which takes place upon energization of the clutch will be apparent from reference to Figure 2. Here current is assumed to be passing through coil 13, causing magnetization of members 7 and 9, which now present a north- and a south-seeking pole at 7' and 9' (their peripheries), or vice versa, depending upon the direction of flow of the magnetizing current. This magnetization of members 7 and 9 causes the iron particles to adhere to these members and to each other along the lines of magnetic flux, the strength of such adhesion being roughly proportional to the strength of the magnetic field developed, up to the point of saturation.

A variant form of clutch is shown in Figure 3, for, whereas a single coil and a single gap were used in the clutch of Figures 1 and 2, this form provides four gaps in series. Here, supports 1 are provided for bearings 2 in which shafts 3' and 5 rotate. Shaft 3' is hollow and contains journal 4 in which shaft 3 rotates. A cup made of a number of nonmagnetic segments, as for example 18, 18' and 18", is affixed at one end to shaft 5, and at the other end to shaft 3', which are also preferably of nonmagnetic material. Between the segments of the cup are carried two rings 17, 17', which are approximately T-shaped in cross section, the crossbar being represented at 20, 20'.

The central active member of the clutch 9a is milled to receive a plurality of electrically insulated coils 13, 13', which are connected by leads 14, running through a suitable passageway 15, to slip rings 16. The space between member 9a and cup 18, 18', 18" is filled with an iron-oil mixture with only enough iron powder in the mixture just to fail to fill completely the space between the peripheral surface of member 9a and the inner periphery of cup 18, 18', 18". This mixture is afforded means of circulation through holes 19, 19' in rings 17, 17'.

It will be seen that when the clutch is in the unenergized condition, the action is much like that of the form of clutch shown in Figure 2 and described above, in that upon rotation of shaft 5 and cup 18, 18', 18", the iron will centrifuge outward, the only drag upon member 9a being through bearing 4 and light oil 12, which is of very low order.

The action, when current is passed through coils 13, 13', is seen in Figure 4, where north- and south-seeking poles are caused to appear in member 9a and rings 17, 17', as indicated by the letters N and S, respectively. The iron powder 12 is attracted to these poles, serving to bind together member 9a and rings 17, 17', and thus cup 18, 18', 18" to which said rings are affixed, the degree of such binding being proportional to the amount of current passed through the coils up to the saturation point. Through the action described, torque from driving shaft 5 is transmitted to driven shaft 3.

It will thus be seen that I provide the optimum amount of iron, since at high running speeds, in the de-energized condition, the inner clutch member rotates, in effect, in an oil bath, while in the energized condition the iron particles are shifted only very slightly, enough of them being moved to fill the gap which previously existed between the innermost layer of powder 11 and the outer cylindrical surface of members 7 and 9, in the case of Figures 1 and 2. If this gap is made very small, as can readily be done, the total volume of iron particles which require moving to completely fill this gap is very small, and this is readily accomplished in practice without requiring an unduly large magnetic field structure. From this point the action is more or less the same as in ordinary magnetic fluid clutches where the gap is always full of available iron particles. However, since the effect of the centrifugal force due to the radial gradient of intensity of the magnetic field, the clutch will release very quickly even at high rotational speeds. This is true because as soon as the magnetic field is cut off, the centrifugal force will instead of tending to hold the particles packed in the gap, tend to separate the particles from the inner cylindrical surface, thus releasing the clutch very quickly. When the clutch is energized, however, if the outer cylinder member is rotating at high speed the action is theoretically slower with the above described construction than with previous constructions. However, in practice this does not appear to offer any great difficulty, and clutches so built appear to have a very satisfactory energization response. In most applications the driven member will originally be at rest until it is clutched to the driving member, the outer cylinder will be rotating immediately prior to energization of the clutch, which will insure proper distribution of the particles as shown for example in Figure 1 so that the necessary clearance will be provided between the iron particles and the inner cylinder surfaces.

It will be apparent that the embodiments shown are only exemplary and that various modifications can be made in construction and arrangement within the scope of my invention as defined in the appended claims.

I claim:

1. A magnetic fluid clutch comprising relatively rotatable members having axially spaced coaxial cylindrical paramagnetic surfaces of substantially equal radius; enclosure means rotatable with one of said members to define a substantially cylindrical gap between said enclosure means and said cylindrical surfaces, a mixture of paramagnetic particles and fluid in said gap, the quantity of particles being insufficient to entirely bridge the gap when uniformly distributed therein, but sufficient to bridge the gap at concentrated areas thereof, and means for producing magnetic poles of opposite polarity on the respective relatively rotating paramagnetic surfaces to form a magnetic field in said gap having a component of intensity increasing radially inward whereby to attract paramagnetic particles to said paramagnetic surfaces.

2. A magnetic clutch comprising two relatively rotatable members including axially spaced longitudinally fixed coaxial cylindrical paramagnetic surfaces of substantially equal radius, inclosure means rotatable with one of said members to define a substantially cylindrical gap between said inclosure means and said cylindrical surfaces, paramagnetic particles in said gap, the quantity of said particles being insufficient to entirely bridge the gap when uniformly distributed therein, but sufficient to bridge the gap at concentrated areas thereof, and means for producing magnetic poles of opposite polarity on the respective relatively rotating paramagnetic surfaces to form a magnetic field in said gap having a component of intensity increasing radially inward whereby to attract paramagnetic particles and bridge said paramagnetic surfaces.

3. A magnetic clutch comprising two relatively rotatable members having axially spaced longitudinally fixed cylindrical paramagnetic elements of substantially equal radius, inclosure means rotatable with one of said members to define a substantially cylindrical gap between said inclosure means and said cylindrical elements, paramagnetic particles in said gap, the quantity of said particles being insufficient to entirely bridge the gap when uniformly distributed therein, but sufficient to bridge the gap at concentrated areas thereof, and means for producing magnetic poles of opposite polarity on the respective spaced paramagnetic elements to form a magnetic field in said gap having a component of intensity increasing radially inward whereby to attract the said paramagnetic particles and bridge the said paramagnetic elements.

4. The invention recited in claim 3 wherein said last means comprises a magnetic field winding.

5. The invention recited in claim 4 wherein said magnetic field winding is coaxial with said elements whereby the said paramagnetic particles bridge the said elements in an axial direction.

6. The invention recited in claim 5 wherein one of said elements comprises a disked dish.

7. A magnetic clutch comprising two relatively rotatable members having axially spaced longitudinally fixed cylindrical paramagnetic elements of substantially equal radius, inclosure means rotatable with one of said members to define a substantially cylindrical gap between said inclosure means and said cylindrical elements, a mixture of paramagnetic particles and a fluid vehicle in said gap, the quantity of particles being insufficient to entirely bridge said gap but sufficient to bridge said axially spaced elements, and means for producing magnetic poles of opposite polarity on the respective spaced paramagnetic elements to form a magnetic field in said gap having a component of intensity increasing radially inward whereby to attract the said paramagnetic particles and bridge the said axially spaced elements.

8. A magnetic fluid clutch comprising two relatively rotatable members between which force is to be transmitted, said members having respective axially spaced longitudinally fixed equiradial paramagnetic surfaces and closure means constructed to retain fluid and to define with said surfaces an annular gap, a mixture of paramagnetic particles and fluid in said gap, the quantity of particles being insufficient to entirely bridge the gap when uniformly distributed but sufficient to bridge said axially spaced surfaces, means for producing magnetic poles of opposite polarity on the respectively spaced paramagnetic surfaces to form a magnetic field in said gap having a component of intensity increasing radially inwardly whereby to attract said paramagnetic particles and bridge said axially spaced surfaces.

9. A magnetic clutch comprising two relatively rotatable members having axially spaced longitudinally fixed cylindrical paramagnetic elements, inclosure means rotatable with one of said members to define a substantially cylindrical volume, one of said elements comprising at least one ring which is substantially T-shaped in cross section, paramagnetic particles in said volume, the quantity of said particles being insufficient to entirely fill the volume when uniformly distributed therein, but sufficient to fill the volume at concentrated areas thereof, and means for producing magnetic poles of opposite polarity on the respective spaced paramagnetic elements to form a magnetic field in said volume having a component of intensity increasing radially inward whereby to attract the said paramagnetic particles and bridge the said paramagnetic elements.

JACOB RABINOW.

REFERENCES CITED

The following references are of record in the file of this patent:

UNITED STATES PATENTS

| Number | Name | Date |
|---|---|---|
| 2,519,449 | Findley | Aug. 22, 1950 |
| 2,525,571 | Winther | Oct. 10, 1950 |
| 2,541,831 | Prince | Feb. 13, 1951 |

OTHER REFERENCES

Technical Report 1213, National Bureau of Standards, Washington, D. C. (Copy received March 30, 1948.)